United States Patent
Loose (10) Patent No.: US 10,961,059 B2
(45) Date of Patent: Mar. 30, 2021

(54) PARCEL PROCESSING SYSTEMS AND METHODS USING SELECTIVE PARCEL ROTATION

(71) Applicant: Siemens Logistics LLC, DFW Airport, TX (US)

(72) Inventor: Jochen Loose, Bedford, TX (US)

(73) Assignee: Siemens Logistics LLC, DFW Airport, TX (US)

( * ) Notice: Subject to any disclaimer, the term of this patent is extended or adjusted under 35 U.S.C. 154(b) by 0 days.

(21) Appl. No.: 16/551,937

(22) Filed: Aug. 27, 2019

(65) Prior Publication Data

US 2021/0061578 A1 Mar. 4, 2021

(51) Int. Cl.
*B65G 47/24* (2006.01)

(52) U.S. Cl.
CPC ...... *B65G 47/24* (2013.01); *B65G 2201/0285* (2013.01)

(58) Field of Classification Search
CPC .............. B65G 47/244; B65G 47/2445; B65G 2203/0225; B65G 2203/041; B65G 47/24; B65G 2201/0285
USPC ........................................................ 198/401
See application file for complete search history.

(56) References Cited

U.S. PATENT DOCUMENTS

| | | | |
|---|---|---|---|
| 5,038,911 A | 8/1991 | Doane et al. | |
| 5,172,800 A * | 12/1992 | Brown | B65G 47/2445 198/380 |
| 5,267,638 A | 12/1993 | Doane | |
| 5,341,916 A | 8/1994 | Doane et al. | |
| 5,660,262 A * | 8/1997 | Landrum | B65B 7/26 198/411 |
| 6,694,220 B1 * | 2/2004 | Tanz | B65G 1/0478 198/369.4 |
| 7,090,067 B2 * | 8/2006 | Schiesser | B65G 15/22 198/395 |
| 7,191,895 B2 | 3/2007 | Zeitler et al. | |
| 7,413,071 B2 | 8/2008 | Zeitler et al. | |
| 8,408,380 B2 | 4/2013 | Doane | |
| 9,221,622 B2 * | 12/2015 | Morency | B65G 41/002 |
| 2012/0228085 A1 * | 9/2012 | Sjogren | B65G 47/2445 198/415 |
| 2012/0298481 A1 * | 11/2012 | Fourney | B65G 39/00 198/413 |
| 2017/0233197 A1 * | 8/2017 | Keller | B65G 47/82 198/401 |
| 2018/0072510 A1 * | 3/2018 | Rollwa | B65G 47/244 |

OTHER PUBLICATIONS

Elmardini, A., "Parcel Singulation Systems and Methods", PCT Application No. PCT/US2019/022446, filed Mar. 15, 2019, pp. 42.

* cited by examiner

*Primary Examiner* — James R Bidwell (57) ABSTRACT

Parcel processing systems and methods. A method for processing parcels includes receiving a stream of a plurality of parcels on a conveying system of a parcel processing system. The method includes receiving physical characteristics of a parcel of the plurality of parcels. The method includes selectively reorienting the parcel on the conveying system based on the physical characteristics.

16 Claims, 5 Drawing Sheets

PARCEL PROCESSING SYSTEMS AND METHODS USING SELECTIVE PARCEL ROTATION

TECHNICAL FIELD

The present invention relates to an apparatus, system and method of efficiently organizing a stream of articles into an ordered stream of single items spaced from each other for subsequent processing.

BACKGROUND OF THE DISCLOSURE

In high volume product handling operations, such as mail handling and similar processing, large quantities of items such as boxes, parcels packages or parts often varying widely in size, must be inducted into a sorter system. Typically, a feeder system for use in such processing areas takes a disordered stream of items fed to it on a conveyor and inducts the items onto a sorter system. The feeder system ideally should perform several functions. To the maximum extent possible, the feeder should singulate disordered items in order to present the articles to downstream processing equipment, such as a sorter, one at a time with some minimum specified spacing or separation between product items. The feeder system must also provide for the reading of destination information from the item so that the control system for the sort can track it through the system and sort it correctly. In the U.S., scannable bar codes are used for this purpose in automated systems. A third important function is intercepting and removing items which are non-machinable because they are too large, too heavy or the like from the system for special handling.

Singulation is an important first step in the handling and sorting of product items such as boxes, soft packages, or other parcels. As used herein, "parcel" refers to any item being processed as described, including a box, tube, irregularly-shaped item, or otherwise. Parcel singulation, as used herein, refers to the generation of a flow of discrete parcels having no two parcels abreast, stacked, or having a gap or lineal (in the direction of flow) separation less than some minimum value. In other words, singulation is a process whereby a randomly input stream of items moving on a conveyor system is separated into a stream of single items spaced from each other so that a downstream process can readily perform operations on each item one at a time. Mixed item streams are a particular challenge in that a mixed material stream may include packages that vary greatly in size and may be piled at random one upon another, forming agglomerates of packages that are difficult to detect and separate.

Presently, singulation is accomplished in two ways, by manual manipulation of material on bulk conveying lines and with mechanical singulators that rely on the mechanical characteristics of the material being singulated to generate an output stream in which the probability that each parcel is singulated is high. While manual operations can be relatively effective, they are costly; and high throughput, either continuous or in bursts, can exceed an individual's capacity, resulting in "doubles" or "multiples" (unsingulated output). Conventional mechanical singulation schemes vary widely in method, throughput, and error rates, but tend to be large (requiring a large amount of floor space) and subject to high error rates when handling material at the margins of the mechanical material specifications for which they are designed and/or tuned. They too tend to degrade in performance when they encounter heavy bursts of material flow.

Once singulated into a single-item-at-a-time flow, the gap or pitch between each of the items must be adjusted to ensure a minimum spacing for the downstream processing equipment. The shape or orientation of the items may affect how densely the items can be processed while still maintaining the target gap or pitch. Improved systems and methods are desirable.

SUMMARY OF THE DISCLOSURE

Disclosed embodiments relate to systems and methods for parcel processing, and other devices, systems, and methods as disclosed herein.

A method for processing parcels includes receiving a stream of a plurality of parcels on a conveying system of a parcel processing system. The method includes receiving physical characteristics of a parcel of the plurality of parcels. The method includes selectively reorienting the parcel to a substantially crosswise orientation on the conveying system based on the physical characteristics.

Various embodiments include a conveyor system, a reorienter, and a control system connected to control the conveyor system and the reorienter, configured to perform processes as disclosed herein. Various embodiments include a non-transitory computer-readable medium storing executable instructions that, when executed, cause a control system of a parcel processing system to control the parcel processing system to perform methods as disclosed herein.

In various embodiments, the physical characteristics include physical dimensions of the parcel. In various embodiments, physical characteristics include the current orientation of the parcel. Various embodiments also include, when the parcel is not reoriented to the substantially crosswise orientation, reorienting the parcel to a substantially lengthwise orientation. In various embodiments, selectively reorienting the parcel is also based on a maximum parcel dimension of the parcel processing system. In various embodiments, selectively reorienting the parcel is also based on an aspect ratio requirement of the parcel processing equipment. In various embodiments, selectively reorienting the parcel includes reorienting the parcel to a substantially lengthwise orientation. Various embodiments also include applying one or more rules to the physical characteristics of the parcel, and wherein selectively reorienting the parcel is also based on the application of the one or more rules to the physical characteristics. In various embodiments, each parcel in the stream of parcel is selectively reoriented based on respective physical characteristics. Various embodiments also include gapping the plurality of parcels after the selective reorientation has been performed on each parcel. Various embodiments also include, when the parcel is not reoriented to the substantially crosswise orientation, reorienting the parcel to a substantially lengthwise orientation.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

The figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

A singulator provides a means of generating a stream of single parcels, such as cartons, from a single layer bulk flow, accumulation, or batch containing one or more of the parcels. It is used to convert a bulk material flow or batch to a stream of single items with controlled spacing on a conveying device such as may be needed for some process such as reading or sorting. It accomplishes accurate separation of a wide spectrum of parcels using knowledge of parcel locations, speeds or other dynamics, and other information acquired by various means, computer processing using a straightforward algorithm, and a suitable conveying mechanism to selectively pull parcels piece-by-piece from a single layered, bulk accumulation of parcels, i.e. with an intelligent process. Examples of parcel singulations systems and methods are described in international patent application PCT/US2019/022446, filed Mar. 15, 2019, incorporated herein by reference.

A parcel singulator will take parcels moving in bulk at its input, and singulate and space those parcels so that, at its output, parcels will come out singulated with at least a minimum gap or pitch between each parcel. Before entering the singulator, parcels will be generally moving in bulk on the conveyor belt and their speed cannot be controlled individually.

Inside the singulator, the parcels will enter a stage of matrix belts, rollers, or other conveyor sections where each parcel's speed can be controlled individually. The singulator will track the position each parcel, from the time it enters the singulator until it exits, such as in a parcel list.

Some systems perform the singulation process by parcel extraction. In such processes, the singulator system can monitor the bulk stream of parcels using the list to calculate the gap for each parcel.

These systems can then assign a state for each parcel, based on its gapping requirements, to be unsingulated, extracting, or singulated. If the gapping requirements are not met, then the parcel will be designated as "unsingulated." If the gapping requirements are met, then the parcel will be designated as "singulated." A parcel assigned as "extracting" is the next unsingulated parcel that has been selected by the system to become singulated.

These systems can then assign a speed to each parcel in the list. If the parcel is singulated, it will be assigned a high or maximum speed. Then the first unsingulated parcel in the list after the singulated parcel will be selected, designated "extracting," and assigned a high speed. Then the rest of unsingulated parcels will be assigned to run at low or minimum speed. This speed differential separates the extracting parcel from the following unsingulated parcel(s) and so causes it to be effectively singulated.

Once the extracting parcel accelerates from low to high speed and becomes singulated, its state is changed to "singulated," and the next unsingulated parcel will be selected for extraction.

Known techniques and systems for parcel handling are described, for example, in U.S. Pat. Nos. 7,191,895 B2, 7,413,071 B2, 8,408,380 B2, 5,038,911 A, 5,267,638 A, 5,341,916 A, and 7,090,067 B2, each of which is hereby incorporated by reference.

In some systems, the singulator takes the primary role in converting the bulk flow of parcels into a flow of single items, and a separate apparatus called a "gapper" can be used to adjust the gap or pitch between each parcel. Similarly, a gapper may be used where the parcels are already in a single-item flow, but the gap or pitch needs adjustment. In the description of disclosed embodiments, the term "gapper" will be used to refer to any apparatus that performs as described or claimed, whether implemented as a separate device, part of a singulator, integrated into any other parcel processing device or system, or otherwise, and all of these alternatives are intended to be included in the term "gapper."

As used herein, the "gap" refers to the distance between the trailing edge or corner of a first parcel and the leading edge or corner of the following parcel. The "pitch," by contrast, refers to the distance between the leading edge or corner of a first parcel and the leading edge or corner of the following parcel. In still other cases, instead of the gap or pitch, the parcels are spaced according to their relative centerlines.

Figure 1A:
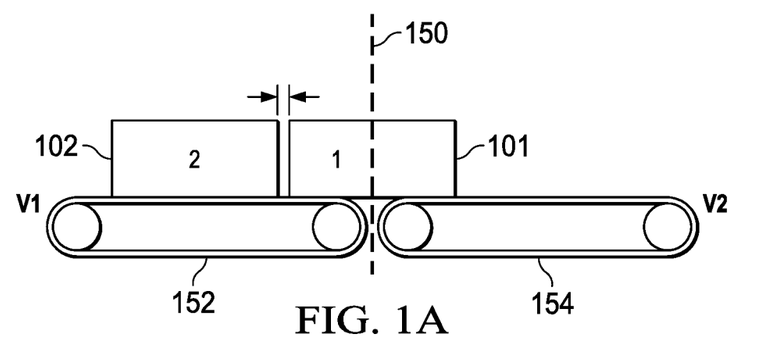
FIGS. 1A-1C illustrate different spacing of parcels by gap, pitch, and centerline in accordance with disclosed embodiments.
Figure 1B:
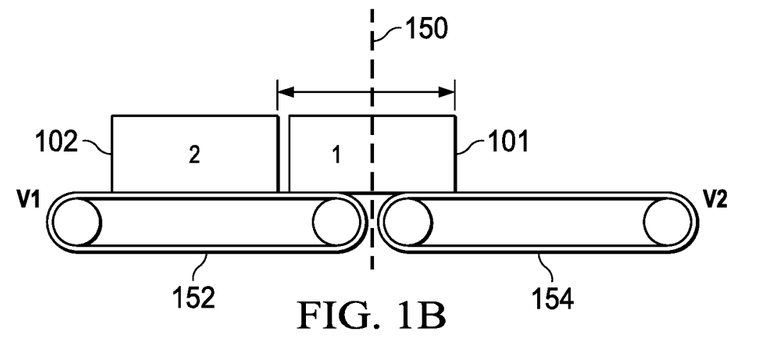
Figure 1C:
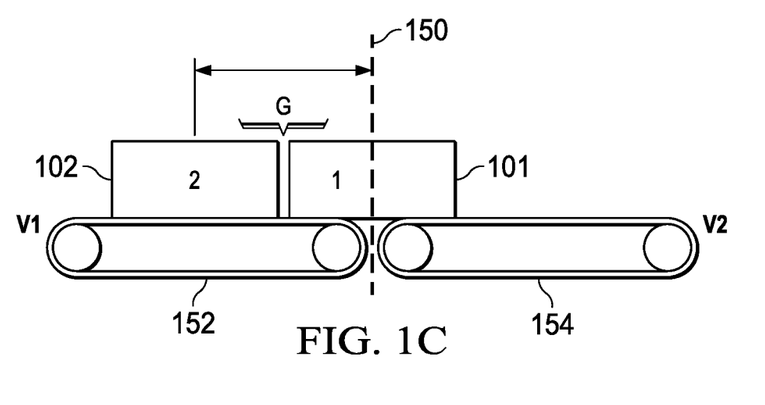

FIGS. 1A-1C illustrate different spacing of parcels by gap, pitch, and centerline. Gap or pitch are typically manipulated by creating a "velocity boundary" between two items, so that the items being transported move at different speeds, which changes the distances of both pitch and gap as well as centerline-to-centerline distance. The velocity boundary 150, as illustrated in these figures, can be created by the difference in speed of two different conveyor portions, rollers, or other mechanisms used to transport the parcels at adjustable speeds.

In the examples of FIGS. 1A-1C, G represents the current gap between a first parcel 101 and a second parcel 202, as the parcels travel left-to-right from conveyor 152 to conveyor 154. V1 represents the surface velocity of conveyor 152 (and therefore the velocity of second parcel 102), and V2 represents the surface velocity of conveyor 154 (and therefore the velocity of first parcel 101). In the formulas below, L1 represents the length of first parcel 101 and L2 represents the length of second parcel 102.

In a system as disclosed herein, the system senses the physical characteristics of each parcel using one or more known sensors. In other cases, the system may already store the physical characteristics of each parcel in a parcel profile for each parcel. Similarly, the system tracks the current location, spacing, and speeds of each parcel, including the current gap G between them. The following formulas can then be used to determine the relative speeds of conveyors 152 and 152 (V1 and V2) to achieve the target spacing between the parcels. In each of the examples below, the system can adjust the velocity boundary—the relative speeds V1 and V2—to achieve the target spacing. In some embodiments, it is useful to keep V2 of the final conveyor section as close to the downstream processing speed as possible, to maximize throughput, while adjusting V1 (and prior conveyor sections) as necessary.

FIG. 1A illustrates gap spacing between parcels 101 and 102. To achieve a target gap (TG) between two parcels, the system can use the formula:

$$TG = \left(\frac{V2}{V1} \times \frac{L1 + L2 + 2G}{2}\right) - \frac{L1 + L2}{2}$$

FIG. 1B illustrates pitch spacing between parcels 101 and 102, from leading edge to leading edge. To achieve a target pitch (P) between two parcels, the system can use the formula:

$$P = \left(\frac{V2}{V1} \times \frac{L1 + L2 + 2G}{2}\right) + \frac{L1 + L2}{2}$$

FIG. 1C illustrates centerline-to-centerline spacing between parcels 101 and 102. To achieve a target centerline-to-centerline distance (C) between two parcels, the system can use the formula:

$$C = \left(\frac{V2}{V1} \times \frac{L1 + L2 + 2G}{2}\right)$$

Because the lengths of any two parcels 101 and 102 is highly variable, the variation in the distance between the items caused by the velocity boundary is also variable. This results in high variability in the throughput and gap at the output. The function of improving the consistency of throughput and gap accomplished using a gapper as disclosed herein. The gapper can use multiple stages of short conveyor sections, each having a highly variable and controllable speed, to create a series of velocity boundaries as illustrated above. Varying the sequential speeds of each conveyor section, and therefore each parcel being processed, allows timing and spacing between items to be made more consistent.

Using only velocity-boundary regulation still leads to some inefficiencies, in that the total length of items being processed and the total interval between those items are constant. Therefore, to increase a specific gap interval, one or more gaps elsewhere must be decreased and shifted across the sequence. Even when a gapper is attempting to regulate to the mode in distribution, the standard deviation in gap influences how many sequential items distant the system would have to extend to potentially achieve regulation. Distribution thereby influences the distance and number of items in a sequence across which the system is attempting to regulate. This distance and number of items can be a key determining factor in the number of velocity boundaries and gapper sections required to regulate a system.

Gapper conveyor sections increase the cost of the system, and even in the ideal system, with what would theoretically be enough gapper sections to accommodate distribution in the interval between items, dynamic limitations of the system (to impart acceleration or deceleration to individual items in sequence and thus shift interval across the sequence) reduce actual efficiency and accuracy. Disclosed embodiments address the inherent limitation in the "zero-sum" game that using only velocity-boundary regulation produces.

Since the width and length ("footprint") of parcels are often different, rotating the parcel can often change the "length" of the parcel in the formulas described above. That is, in each of the formulas above, positioning the parcel, when appropriate, so that the shorter length-or-width dimension functions as the "length" in the formulas above essentially changes the total accumulated length of the items to be processed and thereby enables more efficient spacing.

Figure 2A:
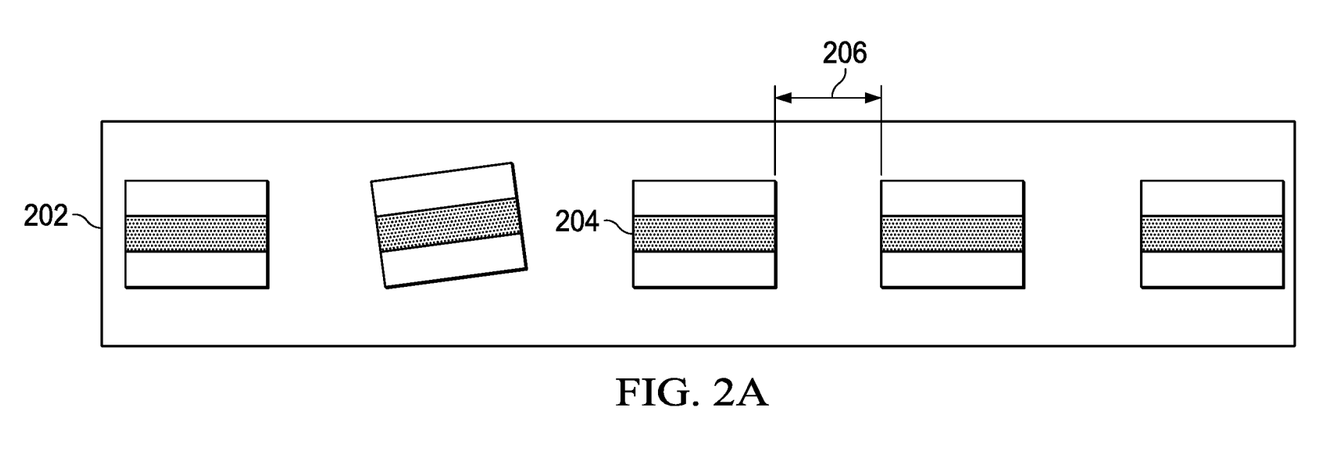
FIGS. 2A and 2B illustrate an advantage of adjusting the orientation of parcels to increase throughput with a specified spacing in accordance with disclosed embodiments.
Figure 2B:
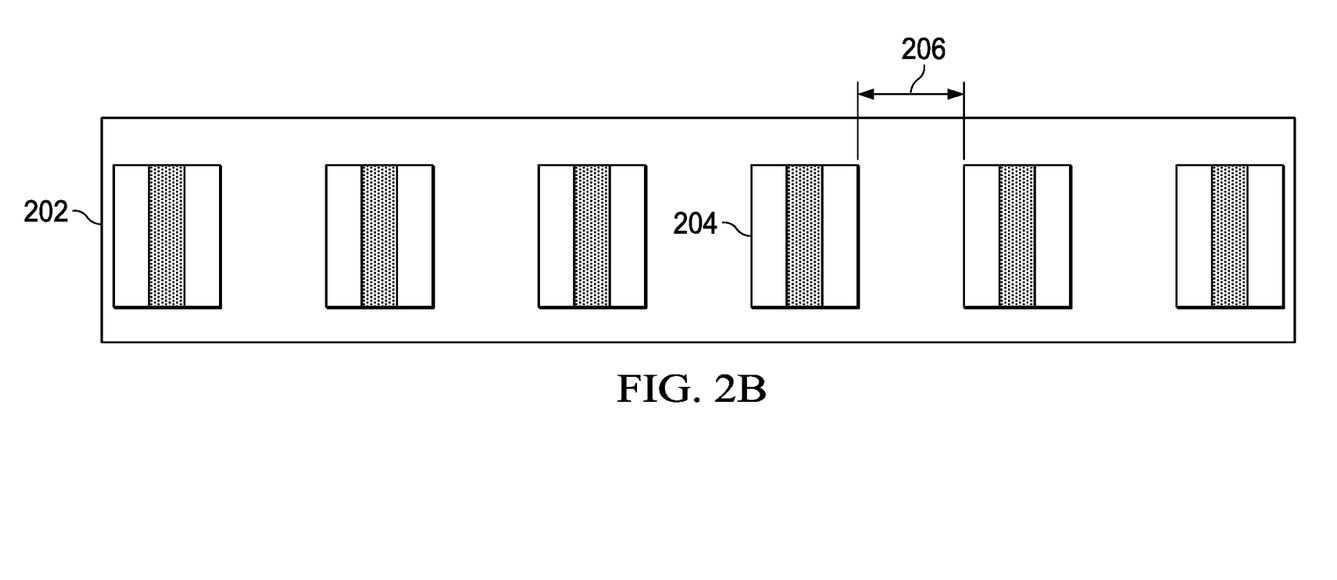

FIGS. 2A and 2B illustrate an advantage of adjusting the orientation of parcels to increase throughput with a specified spacing. In FIG. 2A, each parcel 204 on conveying section 202 has a spacing 206 between the previous and following parcels, and each parcel 204 is oriented so that its longer dimension is substantially along the direction of travel—that is, the longer dimension is the "length" of each parcel when calculating velocities for target spacing. In the example of FIGS. 2A and 2B, gap spacing (the distance between the trailing edge/corner of one parcel and the leading edge/corner of the next parcel) is used, but these principles also apply to pitch and centerline spacing. Note that, using spacing 206, five parcels 204 can travel on conveying section 202 at one time. As used herein, a "lengthwise" orientation refers to a parcel orientation where the length of the parcel is along the direction of travel.

In FIG. 2B, by contrast, each parcel 204 on conveying section 202 again has a spacing 206 between the previous and following parcels, but each parcel 204 is oriented so that its shorter dimension is substantially along the direction of travel—that is, the shorter dimension is the "length" of each parcel when calculating velocities for target spacing. Note that, using spacing 206, and a different orientation, six parcels 204 can travel on conveying section 202 at one time, increasing throughput by 20% for the same size items, the same spacing, and the same given belt speed. As used herein, a "crosswise" orientation refers to a parcel orientation where the width of the parcel is along the direction of travel (or, conversely, the length of the parcel is across the direction of travel).

Disclosed embodiments detect and use the physical characteristics of each parcel to selectively reorient the parcels to increase throughput in a gapper.

Figure 3:
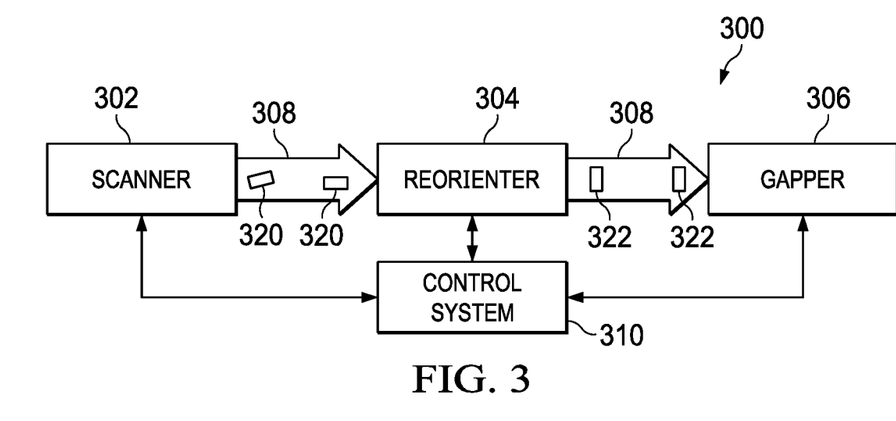
FIG. 3 illustrates components of a parcel processing system in accordance with disclosed embodiments.

FIG. 3 illustrates components of a parcel processing system 300 as disclosed herein. As described, each of these components can be integrated with or interoperate with other components of a parcel processing system not shown here. In this example, the parcel processing system 300 includes a scanner 302, a reorienter 203, and a gapper 306, all in communication with and under the control of a control system 310, as is conveying system 308. In general, a parcel is transported by conveying system 308 between the scanner 302, reorienter 203, and gapper 306, and whatever other components are included in the parcel processing system 300. Conveying system 308 can include any number of conveyor portions implements as belts, rollers, and or other known conveying mechanisms.

The scanner 302 determines physical characteristics of each parcel and transmits them to the control system 310. Scanner 302 can be implemented, for example, by one or more sensors such as light sensors, video sensors, physical switch sensors, scales, barcode scanners, cameras, or other sensors. For purposes of a process described herein, the scanner 302 determines, in particular, the physical dimensions of each parcel, and can determine any other physical characteristics as may be used for other parcel processing operations. Scanner 302 can also determine the current orientation of each parcel, including in particular whether the parcel has a substantially lengthwise orientation or a substantially crosswise orientation. Scanner 302 may be implemented together with the other components described herein, or may be implemented as part of a separate physical system. That is, in a given implementation, the physical characteristics or physical dimensions of a parcel may be scanned at any point when the parcel is processed, and that data may be stored as associated with the parcel and any parcel identifier, so that the control system 310 can latter receive and access that data.

For example, the physical characteristics may be scanned by a scanner 302 at a receiving office or kiosk, and that data stored, before the parcel is transported to a processing center where the reorienter 304 and gapper 306 are located. In such a case, there is not necessarily another scanner 302 at the same processing center, since that data for the parcel is already known. In such a case, the physical characteristics may not include orientation, since the relevant orientation applies during transport at the same location of the reorienter 304.

For the physical dimensions, assuming a box-shaped or regularly-shaped parcel, the general use of the terms "length," "width," and "height" are as follows: "length" refers to the longest dimension, "height" refers to the shortest dimension, and "width" refers to the dimension that is between those. Where two dimensions are the same, the terms may be interchangeable. In general, a parcel being transported will lay on the conveying system so that its length and width extend along and across the surface of the conveying system, and its height represents its height above the surface of the conveying system. A rectangular parcel or tubular parcel may have different length, width, and height; a square parcel may have equal length and width but a different height, and a cubic parcel may have equal length, width, and height. The "aspect ratio" of a parcel refers to the ratio of length to width. An irregular parcel may be irregularly shaped or otherwise not amenable to reorientation based on weight, material, or other physical characteristics.

Reorienter 304 is a mechanism to re-orient a parcel traveling on the conveying system 308 from a substantially lengthwise orientation to a substantially crosswise orientation so its width is substantially along the direction of travel, such as shown in FIG. 2B. For example, each parcel 320 incoming to the reorienter 304 can be selectively rotated to a crosswise orientation so that its width is along the direction of travel, as shown by parcels 322. Note that the orientations need not be exact, either before or after reorientation—"substantially" is used in the common sense of being largely in the specified orientation even if is it not completely or precisely in the that orientation (but not excluding being precisely in that orientation).

Reorienter 304 can be implemented using any number of physical devices, such as a robotic arm, a push-bar or other activator, or otherwise. In particular embodiments, the reorienter 304 can be implemented as described in U.S. Pat. No. 7,090,067, by a system for manipulating articles generally traveling in a direction of conveyance, that includes a bed made up of a plurality of conveyor groups, each of the conveyor groups being aligned with each other in the direction of conveyance and each of the conveyor groups made up of a plurality of individual conveyors positioned side-by-side in a direction transverse to the direction of conveyance. The control system can manipulate parcels traveling on a "manipulation bed" of the reorienter 304 by controlling the speed of the conveyors. The control system can rotate an article positioned on the manipulation bed by controlling the speed of selected conveyors underneath the parcel. In some embodiments, the reorienter 304 includes one or more directionally-controllable rollers configured to rotate the parcel to reorient it as described herein. In various embodiments, the reorienter 304 can also include sensors that determine the current orientation and/or physical characteristics of each parcel, so that functions scanner 302 and reorienter 304 are effectively combined.

Gapper 306 is can be implemented using any known gapping device, particularly if the gapper is not integrated with the reorienter 304. Gapper 304 can be implemented as a separate gapping device or can be integrated with a singulator, the reorienter 304, and/or with any other parcel processing device.

A parcel processing system 300 as described herein can selectively rotate the parcels such that not all parcels are reoriented so that the shortest axis is in the direction of the conveyor. For example, the parcel processing system can consider physical limitations on the width of the conveyor and downstream processing elements. When the length or the hypotenuse of the two axes (length, width, or height) of the parcels nears the limit in width of the conveyor or the width of downstream processing elements, the longest axis (length) should be oriented in the direction of the conveyor transport. As another example, some systems may have limitations in downstream devices based on the aspect ratio of the parcel and the orientation of the parcel with respect to the aspect ratio, where the stability of items being processed would be undermined by excessive asymmetry between length and width if the parcel were reoriented so that the width was along the direction of travel.

Control system 310 can therefore apply one or more rules to the physical characteristics of each parcel 320 to determine whether the parcel should be reoriented. The control system 310 can selectively reorient each parcel such as based on one or more rules such as:

Orienting parcels into a crosswise orientation to increase throughput;

Orienting parcels to comply with a maximum parcel dimension of parcel processing equipment;

Orienting parcels to comply with an aspect ratio requirement of parcel processing equipment, and others.

Figure 4:
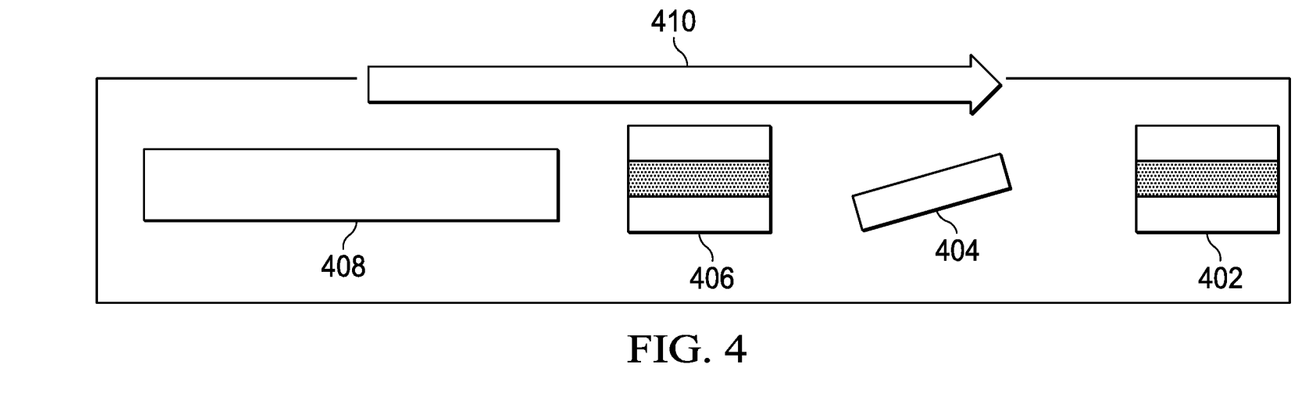
FIG. 4 illustrates an exemplary stream of parcels in accordance with disclosed embodiments.

FIG. 4 illustrates an exemplary stream of parcels 402, 404, 406, and 408. In this example, parcels 402 and 406 are regular parcels but with lengthwise orientation, along the direction of travel 410. Parcels 402 and 406 can be re-oriented to a crosswise orientation so their widths are long the direction of travel 410.

Parcel 404 has an extreme aspect ratio, and so a rule may require that it not be reorientied to a crosswise orientation, and in fact the rule may determine that reorienter 304 reorients or "straightens" it so that its length is substantially along the direction of travel in a lengthwise orientation.

Parcel 408 is too long—its length may violate a maximum parcel dimension of the parcel processing equipment if it had a crosswise orientation, so the rule may determine that reorienter 304 reorients or "straightens" it to a substantially lengthwise orientation so that its length is along the direction of travel, if necessary.

Figure 5:
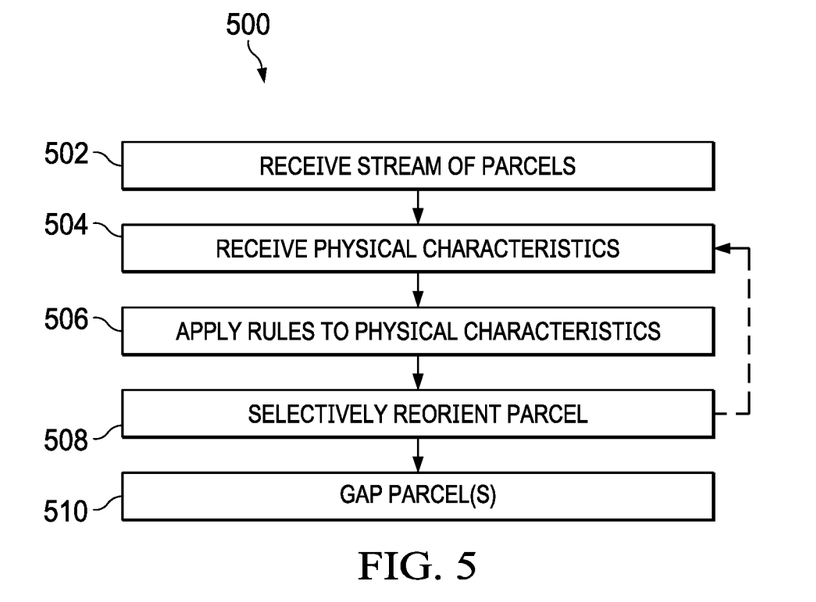
FIG. 5 illustrates a process in accordance with disclosed embodiments.

FIG. 5 illustrates a process 500 in accordance with disclosed embodiments for processing parcels with selective reorientation in a parcel processing system having at least a conveying system, a reorienter, and a control system to control the conveying system and the reorienter. The parcel processing system can include any number of other devices, including scanners, sensors, gappers, singulators, and other devices and systems. The parcel processing system is referred to generically as the "system" below.

The system receives a stream of parcels on a conveying system (502). Typically, the stream of parcels is a sequence of parcels that may be singulated and may be gapped, but such gapping would not be ideal if the parcels have not been reoriented.

The system receives physical characteristics for a parcel in the stream of parcels (504). The physical characteristics can be received by the control system. The physical characteristics can include, for example, the physical dimensions of the parcel and the current orientation of the parcel. "Receiving" this data can include loading from storage, receiving from another device or process, receiving via an interaction with a user, receiving from one or more sensors, receiving from a scanner, or otherwise. In particular, the physical characteristics can be received in multiple ways, such as receiving the physical dimensions from a storage or an upstream scanner and receiving the current orientation of the parcel from another scanner or sensor.

The system can apply one or more rules to the physical characteristics of the parcel (506). These can include any rules describes herein. This can be performed by the control system.

The system selectively re-orients the parcel on the conveying system based on the physical characteristics (508). This can include, if the parcel is in a substantially lengthwise orientation, reorienting the parcel to a substantially crosswise orientation on the conveying system. The selective re-orientation can be performed according to the applied rules as described above.

Processes 504-508 can be repeated for each parcel in the stream of parcels, and these processes can be performed repeatedly, continuously, and concurrently for the parcels in the stream of parcels so that each parcel is selectively reoriented while other parcels are received and processed.

The system can gap the parcel on the conveying system with respect to other parcels (510). Once the parcel (and potentially other parcels) is in the appropriate orientation, a gapping process can be performed to more efficiently gap the parcels on the conveying system as described herein.

The process above can be repeated as long as parcels are still being received to be processed.

Further, disclosed embodiments allow for better flow of parcels after reorientation and at the exit and entry of the gapper. At the exit of the gapper, a system as disclosed herein produces a better, more consistent a flow of parcels, so that the exit of the gapper does not starve for parcels which would cause a drop in parcel throughput and efficiency.

Disclosed embodiments also provide a better input to the next "downstream" parcel processing stage after the reorienter. In a parcel processing system incorporating a disclosed reorienter, the next stage is enabled to handle a higher throughput of parcels by placing a greater number of reoriented parcels in a given space. This allows the direct efficiency improvements of the disclosed processes to be carried to the next stage to improve efficiency across the entire parcel processing system.

Figure 6:
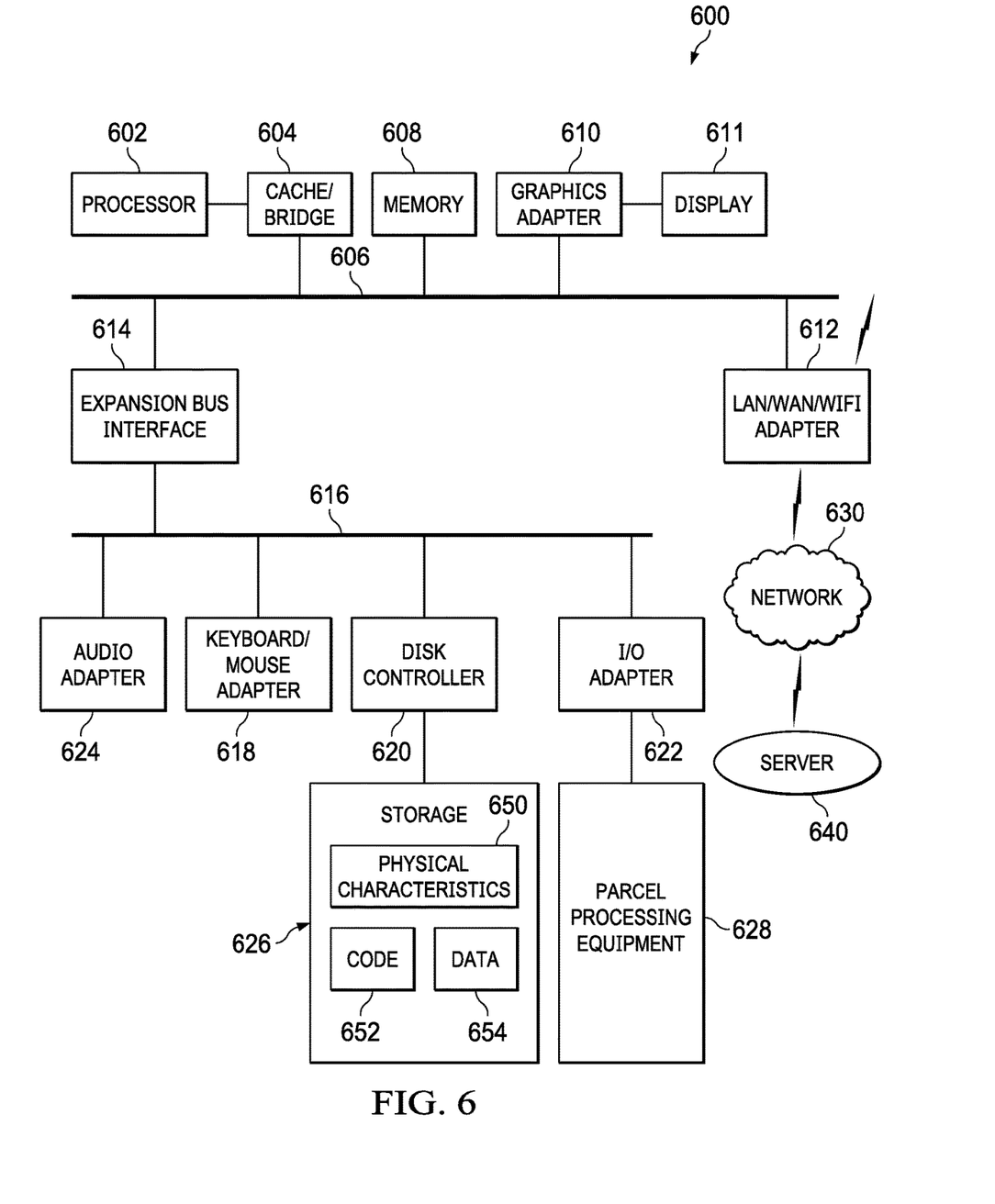
FIG. 6 depicts a block diagram of a data processing system with which an embodiment can be implemented.

FIG. 6 depicts a block diagram of a data processing system 600 with which an embodiment can be implemented, for example as a system for implementing any of the devices, methods, or systems described herein, and can be configured to perform processes as described herein, and in particular can be used as the control system for a parcel processing system or reorienter as described herein. In particular, data processing system 600 can perform any functions or include any additional devices as described above.

The data processing system depicted includes a processor 602 connected to a level two cache/bridge 604, which is connected in turn to a local system bus 606. Local system bus 606 may be, for example, a peripheral component interconnect (PCI) architecture bus. Also connected to local system bus in the depicted example are a main memory 608 and a graphics adapter 610. The graphics adapter 610 may be connected to display 611.

Other peripherals, such as local area network (LAN)/Wide Area Network/Wireless (e.g. WiFi) adapter 612, may also be connected to local system bus 606. Expansion bus interface 614 connects local system bus 606 to input/output (I/O) bus 616. I/O bus 616 is connected to keyboard/mouse adapter 618, disk controller 620, and I/O adapter 622. Disk controller 620 can be connected to a storage 626, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. Storage 626 can store, for example, the physical characteristics 650 discussed above, any executable instructions or other code 652, and any other data 654 useful in performing the processes described herein, other parcel-processing processes, or other processes, including but not limited to gap data, position data, pitch data, speed factor data, speed data, parcel identification data, centerline data, centerpoint data, physical dimensions, weights, orientations, rules, maximum parcel dimensions, aspect ratio requirements, or other data.

I/O adapter 622 can be connected to control or communicate with parcel processing equipment 628, which can include transport devices or conveyors, scanners, sensors, reorienters, booms, sorters, gappers, singulators, diverters, recirculators, or any other hardware disclosed herein or other hardware devices for processing parcels in accordance with the various embodiments described herein.

Also connected to I/O bus 616 in the example shown is audio adapter 624, to which speakers (not shown) may be connected for playing sounds. Keyboard/mouse adapter 618 provides a connection for a pointing device (not shown), such as a mouse, trackball, trackpointer, etc. as well as for keyboard or other user entry devices. In particular, a system as illustrated in FIG. 6 can receive any user interaction or user entry of relevant data, such as a desired (target) spacing, gapping, or pitch distance, a selection of whether the singulation should be based on gap, pitch, centerline/centerpoints, or any other input or configuration information useful for the processes described herein.

Those of ordinary skill in the art will appreciate that the hardware depicted in FIG. 6 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 612 can be connected to a network 630 (not a part of data processing system 600), which can be any public or private data processing system network or combination of networks, as known to those of skill in the art, including the Internet. LAN/WAN/Wireless adapter 612 can also communicate with packages as described herein and perform other data processing system or server processes described herein. Data processing system 600 can communicate over network 630 with one or more server systems 640, which are also not part of data processing system 600, but can be implemented, for example, as separate data processing systems 600. A server system 640 can be, for example, any of the other systems described herein, and so indicates how systems can intercommunicate over network 630.

It is important to note that while the disclosure includes a description in the context of a fully functional system, those skilled in the art will appreciate that at least portions of the mechanism of the present disclosure are capable of being distributed in the form of a computer-executable instructions contained within a machine-usable, computer-usable, or computer-readable medium in any of a variety of forms to cause a system to perform processes as disclosed herein, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto. For example, various embodiments include systems, methods, and computer-readable media.

Although an exemplary embodiment of the present disclosure has been described in detail, those skilled in the art will understand that various changes, substitutions, variations, and improvements disclosed herein may be made without departing from the spirit and scope of the disclosure in its broadest form. In the processes described above, various steps may be performed sequentially, concurrently, in a different order, or omitted, unless specifically described otherwise. Similarly, various elements of the systems and apparatuses described herein can be duplicated, rearranged, or omitted in various embodiments, unless described or claimed otherwise.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A method for processing parcels, comprising:
   receiving a stream of a plurality of parcels on a conveying system of a parcel processing system;
   receiving physical characteristics of a parcel of the plurality of parcels;
   selectively reorienting the parcel to a substantially crosswise orientation on the conveying system based on the physical characteristics;
   gapping the plurality of parcels by a gapper after the selective reorientation has been performed on each parcel;
   the method further comprising applying one or more rules to the physical characteristics of the parcel, wherein selectively reorienting the parcel is also based on the application of the one or more rules to the physical characteristics, to increase throughput with a specified spacing at the gapper.

2. The method of claim 1, wherein the physical characteristics include physical dimensions of the parcel.

3. The method of claim 1, wherein the physical characteristics include the current orientation of the parcel.

4. The method of claim 1, wherein the parcel is reoriented from a substantially lengthwise orientation to a substantially crosswise orientation.

5. The method of claim 1, wherein selectively reorienting the parcel is also based on a maximum parcel dimension of the parcel processing system.

6. The method of claim 1, wherein selectively reorienting the parcel is also based on an aspect ratio requirement of the parcel processing system.

7. The method of claim 1, further comprising, when the parcel is not reoriented to the substantially crosswise orientation, reorienting the parcel to a substantially lengthwise orientation.

8. The method of claim 1, wherein each parcel in the plurality of parcels is selectively reoriented based on respective physical characteristics.

9. A parcel processing system, comprising:
a conveying system,
a reorienter,
a control system connected to control the conveying system and the reorienter, wherein the control system is configured to:
receive a stream of a plurality of parcels on a conveying system of a parcel processing system;
receive physical characteristics of a parcel of the plurality of parcels; and
selectively reorient the parcel to a substantially crosswise orientation on the conveying system based on the physical characteristics; and
a gapper for gapping the plurality of parcels after the selective reorientation has been performed on each parcel,
wherein the control system is configured to apply one or more rules to the physical characteristics of the parcel, and wherein selectively reorienting the parcel is also based on the application of the one or more rules to the physical characteristics, to increase throughput with a specified spacing at the gapper.

10. The parcel processing system of claim 9, wherein the physical characteristics include physical dimensions of the parcel.

11. The parcel processing system of claim 9, wherein the physical characteristics include the current orientation of the parcel.

12. The parcel processing system of claim 9, wherein the parcel is reoriented from a substantially lengthwise orientation to a substantially crosswise orientation.

13. The parcel processing system of claim 9, wherein selectively reorienting the parcel is also based on a maximum parcel dimension of the parcel processing system or on an aspect ratio requirement of the parcel processing system.

14. The parcel processing system of claim 9, wherein the control system is configured to, when the parcel is not reoriented to the substantially crosswise orientation, reorient the parcel to a substantially lengthwise orientation.

15. The parcel processing system of claim 9, wherein each parcel in the plurality of parcels is selectively reoriented based on respective physical characteristics.

16. A non-transitory computer-readable medium storing executable instructions that, when executed, cause a control system of a parcel processing system to:
receive a stream of a plurality of parcels on a conveying system of a parcel processing system;
receive physical characteristics of a parcel of the plurality of parcels; and
selectively reorient the parcel to a substantially crosswise orientation on the conveying system based on the physical characteristics;
gap the plurality of parcels via a gapper after the selective reorientation has been performed on each parcel; and
apply one or more rules to the physical characteristics of the parcel, wherein selectively reorienting the parcel is also based on the application of the one or more rules to the physical characteristics, to increase throughput with a specified spacing at the gapper.

* * * * *